United States Patent [19]
Beezer

[11] 3,779,089
[45] Dec. 18, 1973

[54] ADJUSTABLE MOTION TRANSMITTING DEVICE

[76] Inventor: Earl Beezer, One Andrea Blvd., Saddle Brook, N.J. 07662

[22] Filed: Mar. 27, 1972

[21] Appl. No.: 238,495

[52] U.S. Cl. .............................................. 74/53
[51] Int. Cl. ......................................... F16h 25/08
[58] Field of Search .................. 74/53, 55, 571; 33/27 K, 27 R; 242/158.5

[56] References Cited
UNITED STATES PATENTS

| | | | |
|---|---|---|---|
| 546,055 | 9/1895 | Pitt | 74/55 |
| 1,748,443 | 2/1930 | Dawson | 74/55 |
| 2,370,383 | 2/1945 | Wallace et al. | 74/571 |
| 2,423,701 | 7/1947 | Hardy | 74/55 |
| 2,521,711 | 9/1950 | Gilliano | 74/571 |
| 3,404,459 | 10/1968 | Redman | 33/27 K |

*Primary Examiner*—Mandel A. Antonakas
*Assistant Examiner*—Wesley S. Ratliff, Jr.
*Attorney*—John J. McGlew et al.

[57] ABSTRACT

A motion transmission device includes a first shaft having a first cam thereon which is rotated in timed relationship to a second shaft having a second cam thereon, a slide holder is guided in a housing for movement in a first direction, for example an X-direction, and a slide carried on the slide holder is mounted thereon for movement in a second direction, or Y-direction. A lever is pivotally mounted on the housing and has a first follower connected to the slide and a second pivotal follower which is connected to a drive slide which is movable in a direction parallel to the slide holder, but at a spaced location therefrom. A second cam is rotatably mounted on a shaft and the second follower is moved by the second cam in order to oscillate the lever, and to thus cause the slide holder to move backwardly and forwardly in the X-direction. A crank is pivotally mounted in the housing and is provided with a follower arm which is engaged with the first cam and has an opposite arm with a follower which is engaged with a yoke member carried by the slide to move the first slide member in a Y-direction.

14 Claims, 5 Drawing Figures

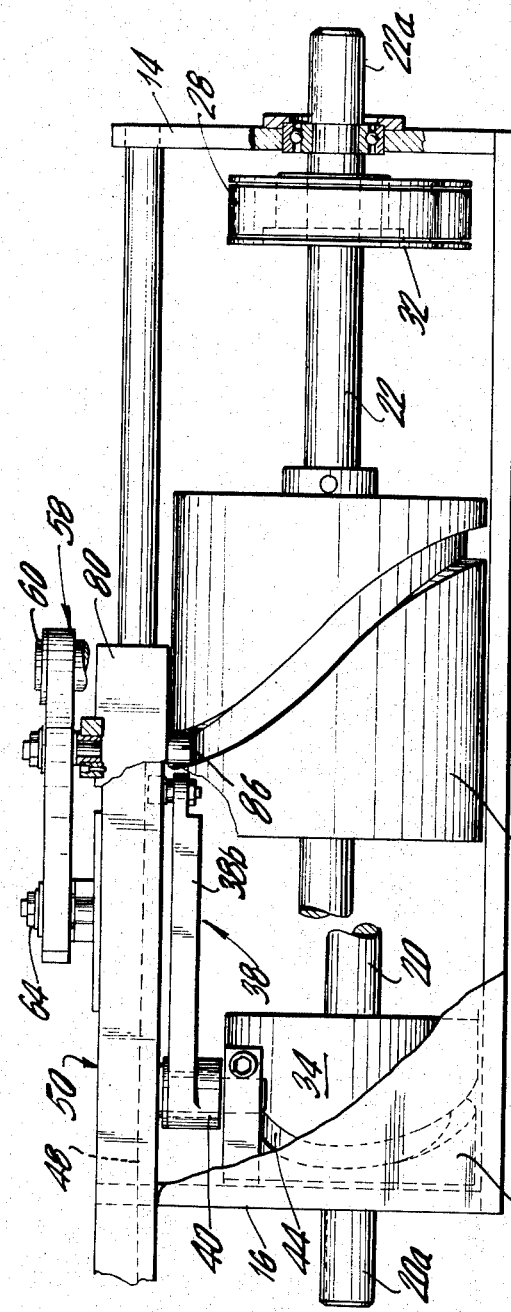

3,779,089

ADJUSTABLE MOTION TRANSMITTING DEVICE

BACKGROUND OF THE INVENTION

1. Field Of The Invention

This invention relates, in general, to motion transmitting devices and, in particular, to a new and useful motion transmitting device which includes a slide which is movable in a controlled motion in an X and Y-direction and which is operated by a pivotal lever with means for easily controlling the stroke and/or velocity of movement.

2. Description Of The Prior Art

At the present time, mechanisms are known which permit the controlled longitudinal and transverse movement of a member, for example, a machine part in a programmed path by combined X and Y movements. The disadvantage of the known mechanisms is that they may not be easily adjusted in order to vary the amount of stroke through which the device moves or the velocity of the device as it moves through the stroke. At the present time, variations in the speed and programming of the movement of a part in response to a rotative movement may be effected only by the displacement of a motion control cam or by varying the driving speed.

SUMMARY OF THE INVENTION

In accordance with the present invention, there is provided a pivotal lever drive mechanism which is driven by a first drum cam driving through a backwardly and forwardly movable support member which is pivotally connected at a first pivot to the lever member so as to oscillate that lever member. A second pivotal connection of the lever member is at a slideway on a support or holder which is guided for back and forth movement. The two pivotal connections may be moved conjointly together or apart in order to vary the speed of the back and forth movement which is effected. A similar arrangement may be provided for driving a movable slide which is mounted for movement on the holder or support member which carries the second pivotal connection, or the slide may be driven directly by an oscillatable crank controlled by a rotatable cam.

The arrangement of the invention makes it possible to adjust the stroke of the slide to thereby vary the velocity by simply adjusting the two pivotal elements on the lever drive member. This makes it possible to synchronize the velocity of the output movement of the slide with, for example, a moving machine part such as a chain conveyor. The lever drive insures that, if the drive cam for the lever is such that a constant velocity is obtained for the oscillation of the lever, there will be a constant velocity of movement of the holder for the slide so that no compensation need be incorporated on the driving cam for the lever.

Accordingly, it is an object of the invention to provide an improved motion transmitting device having an oscillatable lever transmission or drive which provides means for adjusting the stroke or the speed of movement of an output member in response to rotation of a shaft which drives a cam for controlling the movement of the lever.

A further object of the invention is to provide an improved mechanism which includes a support member for a slide which is movable back and forth in accordance with an oscillation of a lever member and which includes a first cam for shifting the slide backwardly and forwardly in the support member and a second cam for controlling the motion of the lever member.

A further object of the invention is to provide a motion transmission device which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the drawings:

FIG. 3 is a bottom plan view with the cover removed partially;

FIG. 4 is a section taken along the line 4—4 of FIG. 2; and

GENERAL DESCRIPTION OF THE PREFERRED EMBODIMENT

Figure 1:
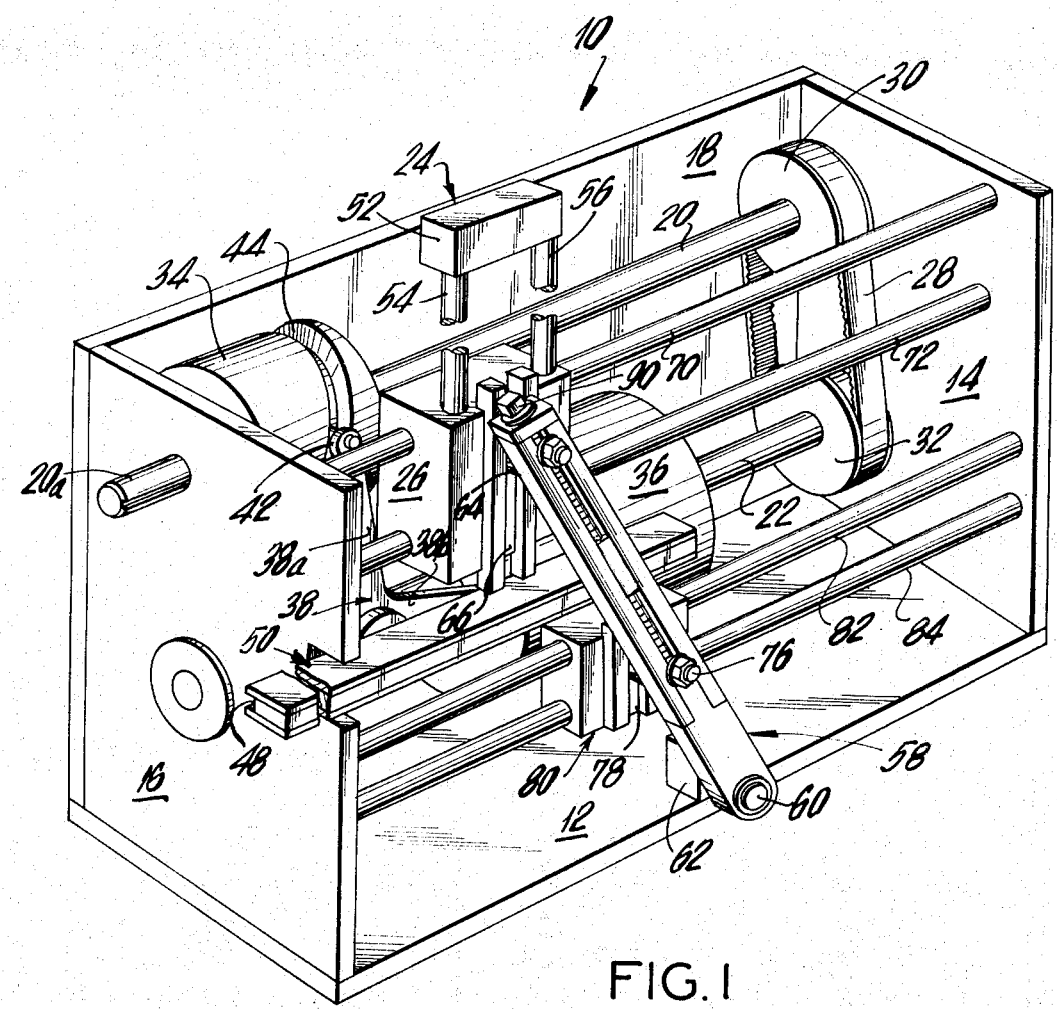
FIG. 1 is a front perspective view of a motion transmitting device constructed in accordance with the invention.
Figure 5:
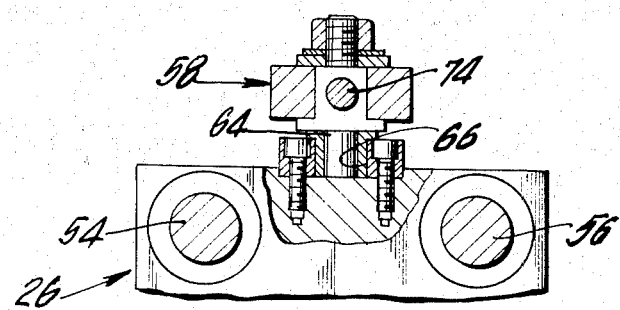
FIG. 5 is a section taken along the line 5—5 of FIG. 2.
Figure 2:
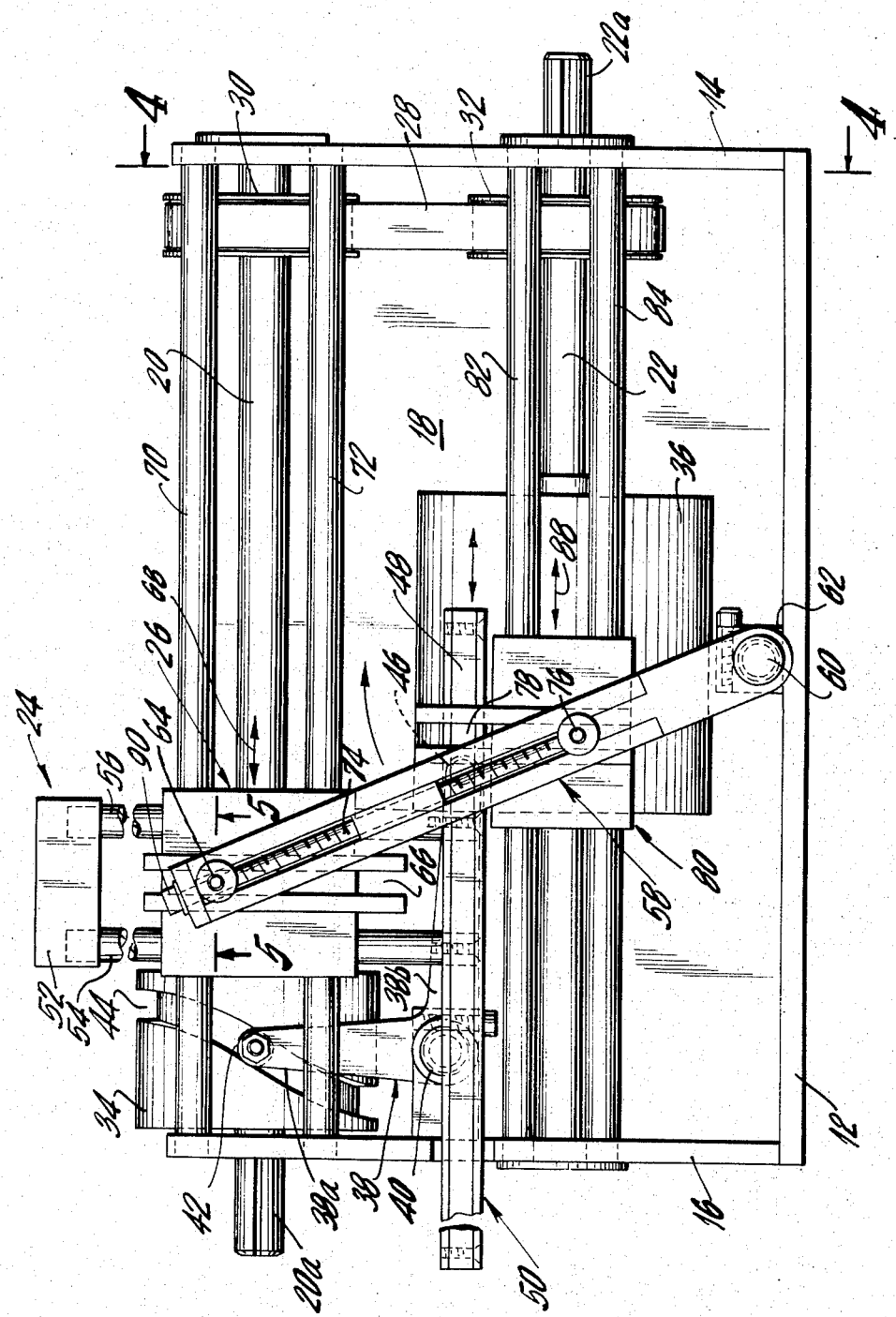
FIG. 2 is a front elevational view of the device shown in FIG. 1.

Referring to the drawings in particular, the invention embodied therein comprises a housing generally designated 10 with a bottom wall 12, end walls 14 and 16 and a rear wall 18. A motion transmitting device is contained in the housing 10 which includes a first shaft 20 which is rotatably supported in end walls 14 and 16 along with a second shaft 22. Either shaft 20 or 22 may be driven through an extension portion 20a or 22a, respectively. Alternatively, a translatory movement, imparted to a slide generally designated 24 or a slide carrier or holder generally designated 26, will impart rotative movements to the first shaft 20 and the second shaft 22, respectively. In the embodiments shown, the shafts 20 and 22 are driven at substantially the same speed through a gear belt drive which includes a gear belt 28 and associated gear pulleys 30 and 32, respectively, secured to shafts 20 and 22.

A first drum cam 34 is secured to shaft 20 for rotation therewith and a second drum cam 36 is secured to shaft 22 for rotating therewith.

A crank lever generally designated 38 has a hub portion which is pivotally mounted on a fixed member 40 which is secured to end walls 16. The crank 38 includes a first arm 38a having a follower 42 which rides in a groove 44 of the drum cam 34. A second arm 38b has a follower 46 which rides in a groove 48 of a yoke member 50 which forms part of the slide 24. The slide also includes a cross member 52 which is adapted to form the output or part which is to be moved, or which is connected to an article to be moved. Rod members 54 and 56 extend between the cross members 52 in the yoke 50, and they are guided in linear ball bearings in the slide holder 26. Oscillation of the crank 38 which is caused by rotation of the cam 34 on its associated shaft 20 causes the slide 24 to move backwardly and forwardly, for example in a Y-direction.

In accordance with the invention, translation or movement of the holder 26 with the slide 24 in an X-direction is effected by oscillation of a lever member, generally designated 58. The lever member 58 is pivotally mounted at its one end on a pivot 60 which is supported on a fixed member 62 carried by the housing bottom 12. The opposite end of the lever 58 carries a pivot follower 64 which moves along a groove or slideway 66 which is defined on the slide holder 26 and pivoting or oscillating of the lever 58 causes the back and forward movement of the slide holder 26 in a direction of the double arrows 68. Guide means in the form of spaced parallel rods 70 and 72, which are supported in the respective end walls 14 and 16, guide the carrier 26 for movement backwardly and forwardly in the X-direction in response to the oscillation of the lever 58. The follower 64 comprises a nut which is threaded to a spindle 74 which is rotatably mounted to extend longitudinally along the lever 58. A second nut follower 76 engages in a groove or guideway 78 of a carrier or drive slide 80 which is movable to and fro on a second set of guide rods 82 and 84 which are supported in end walls 14 and 16. Oscillatable motion is imparted to the lever 58 by the second drum cam 36 acting through a follower 86 which is carried on the carrier 80 to cause a movement of the carrier in the directions of the double arrows 88. The second follower 76 is also threaded on the spindle 74. Spindle 74 may be rotated by engaging a squared nut 90 at one end to cause simultaneous movement of the first follower 64 and the second follower 76 in respective opposite directions, either toward each other or away from each other because an adjustment of the movement of the slide holder 26 in accordance with the oscillation of the lever 58. This adjustment causes adjustment of the amount of movement of the slide holder 26 in the X-direction and this causes a corresponding change in the velocity of movement in the output member 52 of the slide 24. A variation of the stroke of movement of the slide 26 also produces a change in the velocity of the movement because the changed stroke is carried out at the same rotational time of movement of rotation of the respective shafts 20 and 22. Thus, if the spindle 74 is rotated to cause the two followers 64 and 76 to move together, there will be a shorter stroke and, hence, a decrease of velocity of movement and the converse is true if the two followers 64 and 76 are moved apart.

A further change in velocity, of course, may be effected by changing the cam 36 to change the movement characteristics of the lever 58, and also by changing the cam 34 to change the movement characteristics of the slide 24.

A still further change can be effected by changing the speed ratio between the shafts 20 and 22 by changing the gearing through the gear belt drive 28, 30 and 32. Lastly, the shaft speeds of the respective shafts 20 and 22 may be changed and either shaft 20 or 22 may be driven. Alternatively, the shafts may receive the rotation by driving the slide member 24 and the holder 26.

Thus, the invention provides a simple motion transmitting device which permits a large number of adjustments, both as to speed of movement of the output part as well as easy changes in the amplitude of such movement. These changes may be effected by simple adjustment of the first and second follower members carried on an oscillatable driving lever.

While a specific embodiment of the invention has been shown and described in detail to illustrate the application of the inventive principles, it will be understood that the invention may be embodied otherwise without departing from such principles.

What is claimed is:

1. A motion transmitting device comprising a first support member, first guide means supporting said first support member for to and fro movement, a lever pivotally mounted at a fixed location adjacent its one end and connected to said first support member at a spaced location from its pivotal mounting and being oscillatable through an arc to displace said first support member to and fro, a slide on said first support member at a location spaced from the connection of said first support member to said lever and being movable backwardly and forwardly at an angle to the to and fro movement of said first support member, bearing means on said first support member supporting said slide for to and fro movement, and transmission means for moving said slide and said lever in timed relationship.

2. A motion transmitting device, according to claim 1, wherein said transmission means includes a first rotatable cam, a crank arm pivotally mounted adjacent said cam and having a first arm portion oscillatable by said cam and a second arm portion connected to said slide for moving said slide upon oscillation of said crank arm and rotation of said cam.

3. A motion transmitting device comprising a first support member, first guide means supporting said first support member for to and fro movement, a lever pivotally mounted at a fixed location adjacent its one end and connected to said first support member at a spaced location from its pivotal mounting and being oscillatable through an arc to displace said first support member to and fro, a slide movable on said first support member backwardly and forwardly at an angle to the to and fro movement of said first support member, and transmission means for moving said slide and said lever in timed relationship, said transmission means including a second rotatable cam, a second carrier having a follower engaged with said cam, guide means for permitting back and forth movement of said second carrier in response to rotation of said second cam, and a lever follower carried by said second carrier and engaged with said lever for oscillating said lever in response to rotation of said second cam.

4. A motion transmitting device, according to claim 3, including a second lever follower carried by said lever at a spaced location from said first lever follower, said first support member having a slide way engaging said second lever follower, whereby oscillation of said lever causes back and forth movement of said first support member and means for simultaneously adjusting the position of said first and second lever followers along said lever.

5. A motion transmitting device, according to claim 4, wherein said adjustment means comprises a rotatable spindle, said lever followers being threaded on said spindle.

6. A motion transmitting device, comprising a housing, a first cam rotatably mounted in said housing, a second cam rotatably mounted in said housing, means for rotating said first and second cams, a slide holder, first guide means supporting said slide holder for to and fro movement, a slide movable on said slide holder backwardly and forwardly at an angle to the movement of said slide holder, a crank pivotally mounted alongside said first cam and having a first arm with a follower engaged with said first cam and being oscillatable by said first cam to oscillate and crank, said crank having a second arm connected to said slide for moving said slide to and fro on said slide holder, a lever pivotally mounted on said housing, connection means connected between said lever and said slide holder at a spaced location from the pivotal mounting of said lever in said housing for driving said slide holder to and fro upon oscillation of said lever, a drive slide having a follower engaged with said second cam, and a drive slide connection between said drive slide and said lever to oscillate said lever upon rotation of said second cam.

7. A motion transmitting device, according to claim 5, wherein said connection means connected between said lever and said slide carrier includes a slideway defined on said slide carrier and a first follower carried by said lever at a spaced location from the pivotal mounting of said lever and engaged in said slideway.

8. A motion transmitting device, according to claim 5, wherein said drive slide connection between said drive slide and said lever includes a drive slide guide way on said drive slide and a second follower on said lever at a spaced location from the pivotal mounting of said lever and engaged in said drive slide guide way.

9. A motion transmitting device, according to claim 8, wherein said connection means between said lever and said slide carrier includes a slide way defined on said slide carrier and a first follower carried by said lever at a spaced location from the pivotal mounting of said lever and at a spaced location from said second follower, a lever spindle rotatably mounted along the length of said lever, first and second followers comprising nuts threadably engaged with said lever spindle, said lever spindle both being rotatable to shift said first and second follower nuts therealong conjointly in respective opposite directions for adjusting the stroke of movement of said slide holder.

10. A motion transmitting device, according to claim 6, wherein said means for rotating said first and second cams includes a first camshaft upon which said first cam is rotatable, a second cam shaft upon which said second cam is rotatable and gear means interconnecting said first and second cam shafts.

11. A motion transmitting device, according to claim 10, wherein at least one of said first and second cam shafts extends out of said housing for connection to a driving member, said gear means comprising a gear pulley on each of said first and second cam shafts and a gear belt interconnecting said gear pulleys.

12. A motion transmitting device, according to claim 6, wherein said slide comprises a slide frame including a cross member at one end of said frame and a yoke member at an opposite end interconnected by two spaced apart rod members which are slidable in said slide holder, said yoke member defining an elongated slide, said crank second arm having a follower engaged in said yoke slide for transmitting movement to said slide.

13. A motion transmitting device, according to claim 5, including second guide means supporting said drive slide for to and fro movement in response to rotation of said second cam.

14. A motion transmitting device according to claim 1 wherein said transmission means includes a separate member connected to said slide to move said slide backwardly and forwardly on said support member and a second member connected to said lever to oscillate said lever.

* * * * *